United States Patent
House et al.

(10) Patent No.: US 7,655,708 B2
(45) Date of Patent: Feb. 2, 2010

(54) POLYMERIC BLACK PIGMENT DISPERSIONS AND INK JET INK COMPOSITIONS

(75) Inventors: Gary L. House, Victor, NY (US); Anne T. Wyand, Victor, NY (US)

(73) Assignee: Eastman Kodak Company, Rochester, NY (US)

( * ) Notice: Subject to any disclaimer, the term of this patent is extended or adjusted under 35 U.S.C. 154(b) by 275 days.

(21) Appl. No.: 11/387,037

(22) Filed: Mar. 22, 2006

(65) Prior Publication Data

US 2007/0043146 A1 Feb. 22, 2007

Related U.S. Application Data

(63) Continuation-in-part of application No. 11/206,588, filed on Aug. 18, 2005.

(51) Int. Cl.
C09D 11/00 (2006.01)
(52) U.S. Cl. ................ 523/160; 523/161; 524/556; 524/560; 524/561; 106/31.65; 106/31.9
(58) Field of Classification Search .............. 106/31.13, 106/218; 523/160; 524/366; 347/1, 54, 347/56, 68, 73, 100, 112
See application file for complete search history.

(56) References Cited

U.S. PATENT DOCUMENTS

| | | | |
|---|---|---|---|
| 3,347,632 A | 10/1967 | Parker | |
| 4,597,794 A | 7/1986 | Ohta et al. | |
| 5,085,698 A | 2/1992 | Ma et al. | |
| 5,184,148 A | 2/1993 | Suga et al. | |
| 5,221,334 A * | 6/1993 | Ma et al. | 524/167 |
| 5,272,201 A * | 12/1993 | Ma et al. | 524/505 |
| 5,519,085 A * | 5/1996 | Ma et al. | 524/503 |
| 5,609,671 A | 3/1997 | Nagasawa | |
| 5,630,868 A | 5/1997 | Belmont et al. | |
| 5,651,813 A | 7/1997 | Santilli et al. | |
| 5,672,198 A | 9/1997 | Belmont | |
| 5,679,138 A | 10/1997 | Bishop et al. | |
| 5,686,508 A | 11/1997 | Shimomura et al. | |
| 5,718,746 A | 2/1998 | Nagasawa et al. | |
| 5,798,426 A | 8/1998 | Anton et al. | |
| 5,919,294 A | 7/1999 | Hirasa et al. | |
| 5,928,419 A | 7/1999 | Uemura et al. | |
| 5,985,017 A | 11/1999 | Bugner et al. | |
| 6,180,691 B1 | 1/2001 | Cheng et al. | |
| 6,225,370 B1 | 5/2001 | Suthar et al. | |
| 6,245,832 B1 * | 6/2001 | Suzuki et al. | 523/160 |
| 6,383,278 B1 | 5/2002 | Hirasa et al. | |
| 6,503,311 B1 | 1/2003 | Karl et al. | |
| 6,551,394 B2 | 4/2003 | Hirasa et al. | |
| 6,713,531 B2 | 3/2004 | Iijima | |
| 6,866,707 B2 | 3/2005 | Kato | |
| 6,874,881 B2 * | 4/2005 | Suzuki et al. | 347/100 |
| 7,241,333 B2 * | 7/2007 | Koike et al. | 106/31.59 |
| 7,267,716 B2 * | 9/2007 | Nagashima et al. | 106/31.6 |
| 7,300,505 B2 * | 11/2007 | Koike et al. | 106/31.6 |
| 7,314,276 B2 * | 1/2008 | Koike et al. | 347/100 |
| 2002/0077383 A1 | 6/2002 | Takao et al. | |
| 2003/0081086 A1 * | 5/2003 | Suzuki et al. | 347/86 |
| 2004/0127619 A1 | 7/2004 | Sun et al. | |
| 2005/0004261 A1 * | 1/2005 | Yatake | 523/160 |
| 2005/0042164 A1 | 2/2005 | Kennedy et al. | |
| 2005/0128269 A1 * | 6/2005 | Koike et al. | 347/100 |
| 2005/0132931 A1 | 6/2005 | Ham et al. | |
| 2005/0143491 A1 * | 6/2005 | Aoshima | 523/160 |
| 2005/0223938 A1 | 10/2005 | Tyvoll | |
| 2006/0014855 A1 | 1/2006 | House et al. | |

FOREIGN PATENT DOCUMENTS

| | | |
|---|---|---|
| EP | 1 113 051 | 7/2001 |
| EP | 1 394 207 | 3/2004 |
| EP | 1 418 210 | 5/2004 |
| EP | 1 541 644 | 6/2005 |
| EP | 1 394 207 | 11/2006 |
| EP | 1 541 644 | 7/2008 |
| JP | 08-003500 | 1/1996 |
| JP | 11-246805 | 9/1999 |
| JP | 2000-265083 | 9/2000 |

(Continued)

OTHER PUBLICATIONS

T. Lüthge, G. Tauber, R. McIntosh, W. Kalbitz, and S. Lüdtke, Proc. NIP 20: Int. Conf. on Digital Printing Tech., 2004, IS&T, Springfield, VA, pp. 753-757.

Primary Examiner—David Wu
Assistant Examiner—Vu Nguyen
(74) Attorney, Agent, or Firm—Sarah Meeks Roberts; Arthur E. Kluegel; Andrew J. Anderson

(57) ABSTRACT

An ink jet ink composition comprising an aqueous media and a pigment dispersion comprising a specific carbon black pigment and a polymeric dispersant wherein said polymeric dispersant is a copolymer comprising at least a hydrophobic methacrylate or acrylate monomer containing an aliphatic chain having greater than or equal to 12 carbons; and a hydrophilic methacrylic or acrylic acid monomer; wherein said copolymer comprises at least 10% by weight of the methacrylate or acrylate monomer and at least 5% by weight of the methacrylic or acrylic acid monomer; and wherein the copolymer comprises, in total, 20 to 95 weight % of hydrophobic monomer.

21 Claims, No Drawings

FOREIGN PATENT DOCUMENTS

| | | |
|---|---|---|
| JP | 2003-096337 | 4/2003 |
| JP | 2004-035872 | 2/2004 |
| WO | WO2006/019661 | 2/2006 |
| WO | 2006/111462 | 10/2006 |
| WO | WO2006/111462 | 10/2006 |

* cited by examiner

POLYMERIC BLACK PIGMENT DISPERSIONS AND INK JET INK COMPOSITIONS

CROSS REFERENCE TO RELATED APPLICATION

This application is a continuation-in-part of copending U.S. Ser. No. 11/206,588 filed Aug. 18, 2005 the contents of which are incorporated herein by reference.

FIELD OF THE INVENTION

This invention relates to polymeric dispersions of carbon black pigments suitable for image recording. The dispersions are particularly useful in aqueous-based pigmented black ink compositions that are to be ink jet printed onto a variety of receivers requiring excellent text, graphics or photo printing.

BACKGROUND OF THE INVENTION

Ink jet printing is a non-impact method for producing printed images by the deposition of ink droplets in a pixel-by-pixel manner onto an image-recording element in response to digital signals. There are various methods that may be utilized to control the deposition of ink droplets on the image-recording element to yield the desired printed image. In one process, known as drop-on-demand ink jet, individual droplets are projected as needed onto the image-recording element to form the desired printed image. Common methods of controlling the ejection of ink droplets in drop-on-demand printing include thermal bubble formation (thermal ink jet (TIJ)) and piezo electric transducers. In another process known as continuous ink jet (CIJ), a continuous stream of droplets is generated and expelled in an image-wise manner onto the surface of the image-recording element, while non-imaged droplets are deflected, caught and recycled to an ink sump. Ink jet printers have found broad applications across markets ranging from desktop document and photographic-quality imaging, to short run printing and industrial labeling.

Ink compositions used in ink jet printers can be classified as either pigment-based in which the colorant exists as pigment particles suspended in the ink composition, or as dye-based in which the colorant exists as a fully solvated dye species that consists of one or more dye molecules. Pigment-based inks are often preferred over dye-based inks because they possess better fade resistance to light and gas, especially ozone, as compared to printed images with dye-based inks. The pigment particles of pigment-based ink compositions, when printed onto photo-glossy receivers suitable for photographic image quality, typically reside at the surface of the receiver material. Images produced from such pigmented inks exhibit high optical density and good gloss when the dispersion particle sizes are less than about 130 nanometers. When the dispersion pigment particle sizes are less than about 75 nanometers extremely high gloss can be achieved. Image durability is very good when the pigmented inks are comprised of polymeric dispersions or contain additional binders. However, the same pigmented ink compositions, when printed onto uncoated (plain) papers typically used in the home or office environment for routine printing, often provide less density and inferior density consistency as compared to dye-based inks. This is a result of the pigment particles of the pigment-based ink compositions migrating into the interior of the plain paper. The extent of this particle migration varies from paper to paper and depends on the plain paper manufacturing process. Consequently, the pigment particles printed onto such papers receive reduced illumination by incident light, and light scatter that occurs within the plain paper further diminishes the density formed by the pigment particles. In contrast, appreciable colorant in the dye-based ink compositions is absorbed by the paper fibers at or near the surface of the plain paper, which results in higher optical density.

The process of preparing pigment-based ink compositions usually involves two sequential steps: (a) a milling step, conducted in the presence of a dispersing agent, to break up crude pigment aggregates into primary pigment particles that are stabilized by the dispersing agent, and (b) an ink formulation step in which the stabilized pigment dispersion particles are diluted with ink components such as water and water miscible organic compounds (humectants, surfactants, binders, etc.). It is well known in the art that the choice of dispersant in the milling step is critical as it facilitates de-aggregation of the pigment agglomerates and stabilization of the pigment particles as they are being broken up by the mechanical and kinetic energy being provided in the milling process. The choice of dispersant ultimately affects the primary particle size achievable and also determines many of the final physical properties of the dispersion, such as viscosity and surface tension. The dispersant also strongly influences the stability of the dispersion to various ink additives, the jetting quality of the ink, and the final printed image resistance to degradations associated with wet and dry physical abrasion, light and gas fade, and water-fastness.

In the case of organic pigments an efficient dispersion process usually provides a dispersion that exhibits the primary particle sizes associated with the pigment (primary pigment particle sizes are usually determined by the chemical nature of the pigment and its preparative process). Industrial carbon carbon black pigments, however, have many important physical and chemical parameters that can affect the dispersion particle sizes, recorded image quality, and ink performance on various receivers. Important parameters, as described in Carbon Black, Science and Technology, 2d, ed., J. Donnet et al, Marcel Dekker, Inc. 1993, include, primary particle size, aggregate structure as determined by DBP (dibutyl phthalate) oil absorption, and volatiles content. These parameters are determined by the carbon black manufacturing process and any oxidative post treatments the carbon may be subjected to such as those described in U.S. Pat. Nos. 3,347,632; 5,609,671; 5,718,746; 5,928,419; and 6,503,311. For instance, it is known that channel and gas blacks have high DBP oil absorption and high volatiles content whereas furnace blacks have low DBP oil absorption and low volatiles content. Typical DPB absorption values for pigment blacks utilized in printing inks range from about 45 to 125. Carbon pigments, especially, have found wide application in the printing of black text, graphics and photographic images. Today, virtually all black pigment-based ink compositions used in the printing of text, graphics or most photographic quality images are comprised of carbon pigment dispersions of particle size in the sub-micron range.

For the printing of high quality black and white photographic images, writing systems utilizing pigment-based inks sometimes rely on the use of so-called process blacks (printing of CMY pigments) to form a neutral color or, alternatively, on the use of black ink comprised of a surfactant- or polymer-dispersed carbon black for the imaging of neutral colors. Conversely, beginning in the early 1990's much of the desktop ink jet printing industry has adopted the use of black inks comprised of surface functionalized, self-dispersed carbon black pigments for the printing of black text as described in U.S. Pat. No. 5,630,868 to J. Belmont et al, U.S. Pat. No.

5,672,198 to J. Belmont and, in T. Lüthge, G. Tauber, R. McIntosh, W. Kalbitz, and S. Lüdtke, *Proc. NIP 20: Int. Conf. on Digital Printing Tech.*, 2004, IS&T, Springfield, Va., pp 753-757. Pigment inks comprised of self-dispersed black dispersions have provided high text density owing to the efficient aggregation and retention of the carbon black pigment particles at the surface of almost all types of image receivers (plain papers or photo-glossy). As described in U.S. Pat. No. 5,630,868 or Lüthge et al, black inks comprised of such carbon black dispersions exhibit higher optical densities on plain papers as compared to inks comprised of surfactant or polymer dispersed carbon black pigments.

In the case of printing of high quality photographic images onto photo-glossy receivers, high gloss and good durability (resistance to image smear) are of paramount importance whereas the requirements associated with printing of black text/graphics onto plain or other uncoated papers usually center on high visual density and good water fastness and smear resistance. Unfortunately, inks comprised of self-dispersed carbon black pigments such as those disclosed in U.S. Pat. No. 5,630,868, and Lüthge et al, that are highly suitable for text printing show poor smear resistance on uncoated papers and these same inks lack sufficient gloss and image durability to be useful for the printing of high quality photographic images onto photo-glossy papers. Pigment inks that are suitable for printing of photographic quality images onto photo-glossy papers lack the density and density uniformity across the various plain papers often used in desktop ink jet printing. As a consequence ink jet writing systems typically possess a black ink dedicated to the printing of black text/graphics and a separate set of inks dedicated to photo-printing Thus, a major challenge for pigmented ink compositions comprised of polymer-dispersed pigment particles is to provide high density when printed onto uncoated (plain) papers, while simultaneously providing high density, gloss, and image durability on glossy papers and photo-glossy ink jet receivers. One such approach is to use a mixture of pigments dispersed by dissimilar means in the same ink as described in U.S. Patent Application Number 2005/0223938A1. However, this approach has the drawback that two separate pigment dispersions must be manufactured and formulated into a single ink composition.

In addition to the art cited above additional approaches that utilize high molecular weight polymeric dispersants and latexes in the pigmented ink compositions have been employed in drop-on-demand piezoelectric printers directed at photographic quality pictorial image reproduction (U.S. Pat. No. 6,713,531 B2; U.S. Pat. No. 6,180,691 B1; U.S. Pat. No. 6,866,707 B2). Such inks provide high density on uncoated papers and high density, durable images of modest gloss on photo-glossy receivers. Unfortunately, pigmented inks of such compositions cannot be utilized in thermal ink jet since heaters become easily fouled and small diameter nozzles clogged. Other approaches relying on polymeric dispersants containing high hydrophobic to hydrophilic monomer ratios, not suited for aqueous milling processes, have also been disclosed (U.S. Pat. No. 5,798,426 A issued to Anton et al.). Approaches to modify the uncoated paper compositions by incorporating cationic species capable of binding the pigment particles near the surface of the uncoated receiver have also been employed. Such approaches typically increase the cost of the receiver or complicate the paper making process and have not generally been utilized in uncoated receivers commonly used in the home or office.

U.S. Patent Application 2005/0143491 describes certain block copolymers to be utilized in a non-aqueous ink jet ink. U.S. Pat. No. 5,679,138 A, U.S. Pat. No. 5,651,813 A, and U.S. Pat. No. 5,985,017 A describe the preparation of aqueous pigment-based ink compositions for ink jet printing wherein pigment particles are dispersed with surfactants and have an average particle diameter of less than 100 nm. Although these ink compositions are very useful for photographic-quality imaging, the ink compositions therein may not possess sufficient durability on photo-glossy receivers nor provide high density on a variety of receivers, including uncoated papers. U.S. Patent 2005/0004261 A1, U.S. Patent 2004/0127619 A1, U.S. Pat. No. 6,245,832 B1, U.S. Pat. No. 5,085,698 A, and U.S. Pat. No. 4,597,794 A describe aqueous pigment-based ink compositions for ink jet printing wherein pigment particles are dispersed with polymeric materials derived from hydrophobic and hydrophilic monomers. Use of these dispersants and milling processes provides dispersions that frequently have particle sizes equal to or greater than 100 nm. Pigment-based ink compositions produced from such dispersions do not yield the necessary density on uncoated papers. U.S. Ser. No. 10/891,316, filed Jul. 14, 2004, describes the preparation of aqueous pigmented ink compositions for ink jet printing wherein the pigment particles are dispersed with random copolymers and have an median particle diameter less than about 100 nm. While these pigment-based ink compositions provide high durability and density in drop-on-demand image printing applications, they lack the necessary density on uncoated papers. It is not appreciated in the art that the choice of polymeric dispersant, especially the choice of certain monomer types, will markedly influence the interaction of the pigment particles in pigment-based ink compositions with the surface of uncoated papers.

Generally, polymeric dispersants have been selected for their ability to provide stable pigment dispersions and pigmented ink compositions that enable improved performance on photo-glossy receivers while providing good jetting quality within the printing architecture they must operate. Examples of carbon blacks dispersed with polymers are described in U.S. Pat. Nos. 5,184,148; 5,686,508; 5,919,294; 6,383,278; 6,551,394 and U.S. Patent Application Number 2005/0042164A1. Typically, inks comprised of such polymer-dispersed carbon black pigments lack sufficient density and density uniformity when printed onto uncoated papers. In addition, it is not appreciated in the art that key physical and chemical parameters related to carbon black when polymer dispersed with specific polymer of structures described in U.S. Ser. No. 11/206,588, filed Aug. 18, 2005, can greatly enhance the interaction with and aggregation of carbon black particles on the surface of uncoated papers.

There remains the need for 1) a single black ink, useful in thermal and piezoelectric ink jet drop-on-demand printing and continuous ink jet printing, in which the black ink is able to meet all of the important requirements for plain paper printing while at the same time satisfying the important requirements for photo-printing on glossy receivers; 2) a black ink for text and graphics printing which is water-fast and smear resistant; 3) a black ink of carbon black dispersion with an average particle size of less than about 125 nm for improved jetting quality and reliability in ever-decreasing print head nozzle diameters; and 4) a "universal" black pigment-based ink that can simplify system design and enable opportunities for new hardware and writing system architectures.

SUMMARY OF THE INVENTION

The heretofore unmet needs are provided by an ink composition comprising an aqueous media and a pigment dispersion comprising (a) a carbon black pigment having a DBP oil absorption of at least 70 ml/100 gram, and an average effective dispersion particle size of between 55 nm and 200 nm; and (b) a polymeric dispersant wherein said polymeric dispersant is a copolymer comprising at least a hydrophobic methacrylate or acrylate monomer containing an aliphatic chain having greater than or equal to 12 carbons; and a hydrophilic methacrylic or acrylic acid monomer; wherein said copolymer comprises at least 10% by weight of the methacrylate or acrylate monomer and at least 5% by weight of the methacrylic or acrylic acid monomer; and wherein the copolymer comprises, in total, 20 to 95 weight % of hydrophobic monomer.

Also provided is an ink jet printing method comprising the steps of:

A) providing an ink jet printer that is responsive to digital data signals;

B) loading the printer with an ink jet recording element comprising an uncoated or coated ink receiving substrate;

C) loading the printer with a black ink jet ink composition an aqueous media and a pigment dispersion comprising (a) a carbon black pigment having a DBP oil absorption of at least 70 ml/100 gram, and an average effective dispersion particle size of between 55 nm and 200 nm; and (b) a polymeric dispersant wherein said polymeric dispersant is a copolymer comprising at least a hydrophobic methacrylate or acrylate monomer containing an aliphatic chain having greater than or equal to 12 carbons; and a hydrophilic methacrylic or acrylic acid monomer; wherein said copolymer comprises at least 10% by weight of the methacrylate or acrylate monomer and at least 5% by weight of the methacrylic or acrylic acid monomer; and wherein the copolymer comprises, in total, 20 to 95 weight % of hydrophobic monomer; and D) printing on the image receiving element using the ink jet composition in response to the digital data signals.

Further provided is an ink jet printing method comprising the steps of:

A) providing an ink jet printer that is responsive to digital data signals;

B) loading the printer with an ink jet recording element comprising an uncoated or coated ink receiving substrate;

C) loading the printer with at least a cyan ink, a magenta ink, a yellow ink, and a black ink jet ink composition comprising an aqueous media and a pigment dispersion comprising (a) a carbon black pigment having a DBP oil absorption of at least 70 ml/100 gram, and an average effective dispersion particle size of between 55 nm and 200 nm; and (b) a polymeric dispersant wherein said polymeric dispersant is a copolymer comprising at least a hydrophobic methacrylate or acrylate monomer containing an aliphatic chain having greater than or equal to 12 carbons; and a hydrophilic methacrylic or acrylic acid monomer; wherein said copolymer comprises at least 10% by weight of the methacrylate or acrylate monomer and at least 5% by weight of the methacrylic or acrylic acid monomer; and wherein the copolymer comprises, in total, 20 to 95 weight % of hydrophobic monomer; and D) printing on the image receiving element using the ink jet composition in response to the digital data signals; wherein the printer utilizes the black ink composition as the sole black ink.

ADVANTAGEOUS EFFECTS OF THE INVENTION

The invention provides numerous advantages. The invention provides a polymer pigment dispersion and black pigment-based ink composition capable of providing images of high optical density on both coated and uncoated receivers; such images are comparable to and in many instances exceed those achieved with dye-based inks or black pigment-based ink compositions comprising self-dispersed carbon black pigments. The inventive ink compositions provide improved smear resistance and water-fastness on uncoated receivers as compared with the dye-based or black pigment-based ink compositions comprising self-dispersed carbon black pigments. On coated receivers the inventive black ink compositions provide good gloss and improved durability as compared with the black ink compositions comprising self-dispersed carbon black pigments. As a consequence, another advantage of the inventive black ink compositions is that they meet the necessary requirements for text printing on both coated and uncoated receivers and they meet the requirements of printing high quality photo printing on glossy receivers. In essence, a single black ink comprising the inventive black ink composition meets all the necessary requirements for printing on uncoated and coated receivers.

The invention also provides a pigment dispersion that is stable to a variety of ink formulations and is suited to modern-day ink jet printers thus allowing the ink formulator wide latitude in ink design enabling a wide selection of humectants, surfactant, and other protective binders. The invention provides dispersions of high surface tension further enabling wide ink design space. The invention also provides pigment-based ink compositions that are tolerant of extreme temperature ranges.

The invention provides inks that can be jetted easily in both thermal and piezoelectric drop-on-demand printers and continuous ink jet ink printers. The small pigment particle sizes in the pigment-based ink compositions ensure that print head nozzles do not clog even after hundreds or thousands of pages are printed.

DETAILED DESCRIPTION OF THE INVENTION

The recording liquid or ink of the present invention is comprised of a pigment dispersion consisting of carbon black colorant particles in association with a polymeric dispersant. The polymeric dispersants useful in the present invention are copolymers prepared from at least one hydrophilic monomer that is an acrylic acid or methacrylic acid monomer, or combinations thereof. Preferably, the hydrophilic monomer is methacrylic acid. The hydrophilic monomer is present in the copolymer in an amount of at least 5% based on the total weight of the copolymer. Preferably the copolymer comprises 5% to 30% by weight of the methacrylic or acrylic acid monomer, and more preferably 10% to 25% by weight of the methacrylic or acrylic acid monomer. In one embodiment the hydrophilic monomer is present in the copolymer in an amount of at least 15%.

The polymeric dispersants of the invention also comprise at least one hydrophobic monomer. The hydrophobic monomer used to prepare the polymeric dispersant of the present invention is comprised of a carboxylic acid ester-containing functional group. The hydrophobic monomers may be selected from any aliphatic acrylate or methacrylate monomer provided it contains an aliphatic chain comprising greater than or equal to 12 carbon atoms. The chains comprising greater than or equal to 12 carbons may be linear or branched. Examples of specific hydrophobic monomers useful in the present invention include the following: lauryl acrylate, lauryl methacrylate, tridecyl acrylate, tridecyl methacrylate, tetradecyl acrylate, tetradecyl methacrylate, cetyl acrylate, iso-cetyl acrylate, stearyl methacrylate, iso-stearyl methacrylate, stearyl acrylate, stearyl methacrylate, decyltetradecyl acrylate, decyltetradecyl methacrylate, and the like. Preferably the methacrylate or acrylate monomer is stearyl or lauryl methacrylate or acrylate. The hydrophobic portion of the polymer may be prepared from one or more of the hydrophobic monomers.

The hydrophobic monomer having a carbon chain length of greater than or equal to 12 carbons is present in an amount of at least 10% by weight of the total copolymer, and more preferably greater than 20% by weight. The copolymer may also comprise, in addition to the hydrophobic monomer comprising greater than or equal to 12 carbon chains, a hydrophobic monomer comprising an aromatic group. For example, the additional aromatic group containing monomer may be benzyl acrylate or benzyl methacrylate. A preferred additional monomer is benzyl methacrylate.

The total amount of hydrophobic monomers, comprising the monomer having a chain with greater than or equal to 12 carbons and optionally, monomer containing an aromatic group, are present in the polymer in an amount of 20 to 95% by weight of the total polymer. The hydrophobic aromatic-group containing monomer may be present in an amount from about 0 to 85% by weight of the total polymer, more preferably from about 0 to 60%, and most preferably from about 0 to 50%.

The polymeric dispersant (copolymer) of the present invention is not limited in the arrangement of the monomers comprising the copolymer. The arrangement of monomers may be totally random, or they may be arranged in blocks such as AB or ABA wherein, A is the hydrophobic monomer and B is the hydrophilic monomer. In addition, the polymer make take the form of a random terpolymer or an ABC triblock wherein, at least one of the A, B and C blocks is chosen to be the hydrophilic monomer and the remaining blocks are hydrophobic blocks dissimilar from one another. Preferably the copolymer is a random copolymer.

The weight average molecular weight of the copolymer of the present invention has an upper limit such that it is less than about 50,000 daltons. Desirably the weight average molecular weight of the copolymer is less than about 25,00 daltons; more preferably it is less than 15,000 and most preferably less than 10,000 daltons. The molecular weight of the copolymer of the present invention has a weight average molecular weight lower limit such that it is greater than about 500 daltons.

The carbon black employed in the present invention has a DBP oil absorption value of at least 70 ml/100 gram, preferably in the range of about 70 to 200 ml/100 gram. The DBP value of the carbon black is more preferably in the range from about 70 to 150 ml/100 gram and most preferably in the range from about 80 to 140 ml/100 gram. The DBP oil absorption value is the value obtained by the standard testing method in ASTM D-2414. The DBP value is often synonymous with a terminology called "structure" in the art of carbon black pigments. For the present invention, DBP values of less than 70 ml/gram are referred to as low structure carbon blacks and DBP values of greater than or equal to 70 ml/gram are referred to as high structure carbon blacks.

The carbon black employed in the present invention has a percent volatiles content value in the range of about 0.5 to about 15.0 and preferably over 1.0. The percent volatiles content value is more preferably in the range of 1.5 to about 10.0. The percent volatiles content value is most preferably in the range of 2.0 to about 10.0. The percent volatiles content value is a measure of the weight loss in the amount of chemisorbed oxygen liberated after heating the carbon black to elevated temperatures, such as 950° C. Upon heating the chemisorbed oxygen is decomposed through evolution of gases like carbon dioxide, carbon monoxide and water. The percent volatiles content value is obtained by the standard testing method in ASTM D 1620-60.

The carbon black of the present invention is dispersed as a pigment dispersion by the inventive polymeric dispersant wherein, the pigment dispersion particle distribution has a median effective particle diameter from about 55 nm to about 200 nm, preferably 55 to 170 nm and more preferably 55 to 140 nm. As used herein, median particle diameter refers to the 50th percentile such that 50% of the volume of the particles is composed of particles having diameters smaller than the indicated diameter. It is understood the pigment dispersion of the invention are composed of aggregates of primary carbon black smaller than the mean particle diameter from above. Typical primary particle sizes of the carbon black particles comprising the pigment dispersion are in the range of 10 nm to 30 nm.

The median particle diameter in the present invention is measured by using a Microtrac Ultrafine Particle Analyzer (UPA) 150 from Microtrac, Inc. As used herein, median particle diameter refers to the 50th percentile such that 50 percent of the volume of the particles is composed of particles having diameters smaller than the indicated diameter.).

The carbon black pigment dispersion useful in the invention may be prepared by any method known in the art of ink jet printing. Useful methods commonly involve a dispersing or milling step (a) to reduce the agglomerate of carbon black primary particles to a desired size in the presence of the inventive polymeric dispersant. The recording liquid of the present invention is then subjected to a dilution step (b) where the pigment dispersion is diluted with water and/or any other useful addenda known in the art of ink manufacture. Optionally, the pigment dispersion may be manufactured in a single step where some or all of the addenda needed for the recording liquid are present during the milling operation.

The milling step (a) is carried out using any type of grinding mill such as a media mill, a ball mill, a two-roll mill, a three-roll mill, a bead mill, and air-jet mill, an attritor, or a liquid interaction chamber. In the milling step (a), pigments are optionally suspended in a medium, which is typically the same as, or similar to, the medium used to dilute the pigment dispersion in step (b). Inert milling media are optionally present in the milling step (a) in order to facilitate break up of the carbon black to the smallest aggregate size. Inert milling media include such materials as polymeric beads, glasses, ceramics, metals and plastics as described, for example, in U.S. Pat. No. 5,891,231. Milling media are removed from either the pigment dispersion obtained in step (a) or from the ink obtained in step (b).

For the pigment dispersion obtained in step (a) or the ink composition obtained in step (b), the dispersant is present in order to maintain particle stability and prevent settling. In addition to the polymer dispersants of the present invention, there may be, optionally, additional dispersants present for use in the invention such as those commonly used in the art of ink jet printing. For aqueous pigment-based ink compositions, useful dispersants include anionic, or nonionic surfactants such as sodium dodecylsulfate, or potassium or sodium oleylmethyltaurate as described in, for example, U.S. Pat. No. 5,679,138; U.S. Pat. No. 5,651,813; or U.S. Pat. No. 5,985,017.

The carbon black pigment dispersion particles used in the recording liquid of the invention may be present in any effective amount, generally from 0.1 to 10% by weight, and preferably from 0.5 to 6% by weight. The ratio of pigment to polymeric dispersant is not particularly limited and may include a range from about 10:1 to about 1:3. In one embodiment the weight ratio of the copolymer to the pigment is 0.15 to 0.8.

In one embodiment of the invention, the recording liquid is an ink composition that may also contain non-colored particles such as inorganic particles or polymeric particles. The use of such particulate addenda has increased over the past several years, especially in ink jet ink compositions intended for photographic-quality imaging. For example, U.S. Pat. No. 5,925,178 describes the use of inorganic particles in pigment-based inks in order to improve optical density and rub resistance of the pigment particles on the image-recording element. In another example, U.S. Pat. No. 6,508,548 B2 describes the use of a water-dispersible polymeric latex in dye-based inks in order to improve light and ozone resistance of the printed images. The ink composition may contain non-colored particles such as inorganic or polymeric particles in order to improve gloss differential, light and/or ozone resistance, water-fastness, rub resistance and various other properties of a printed image; see for example, U.S. Pat. No. 6,598,967 B1 or U.S. Pat. No. 6,508,548 B2.

Examples of inorganic particles useful in the invention include, but are not limited to, alumina, boehmite, clay, calcium carbonate, titanium dioxide, calcined clay, aluminosilicates, silica, or barium sulfate. Examples of polymeric particles useful in the invention include; water-dispersible polymers generally classified as either addition polymers or condensation polymers, both of which are well-known to those skilled in the art of polymer chemistry. Examples of polymer classes include acrylics, styrenics, polyethylenes, polypropylenes, polyesters, polyamides, polyurethanes, polyureas, polyethers, polycarbonates, polyacid anhydrides, and copolymers consisting of combinations thereof. Such polymer particles can be ionomeric, film-forming, non-film-forming, fusible, or heavily cross-linked and can have a wide range of molecular weights and glass transition temperatures.

Examples of useful polymeric particles are styrene-acrylic copolymers sold under the trade names Joncryl® (S.C. Johnson Co.), Ucar™ (Dow Chemical Co.), Jonrez® (MeadWestvaco Corp.), and Vancryl® (Air Products and Chemicals, Inc.); sulfonated polyesters sold under the trade name Eastman AQ® (Eastman Chemical Co.); polyethylene or polypropylene resin emulsions and polyurethanes (such as the Witcobonds® from Witco Corp.). These polymeric particles are preferred because they are compatible in typical aqueous-based ink compositions, and because they render printed images that are highly durable towards physical abrasion, light and ozone.

The non-colored particles used in the ink composition of the invention may be present in any effective amount, generally from 0.01 to 20% by weight, and preferably from 0.01 to 6% by weight. The exact choice of non-colored particles will depend upon the specific application and performance requirements of the printed image.

Ink compositions may also contain water-soluble polymers often referred to as resins or binders in the art of inkjet ink compositions. The water-soluble polymers useful in the ink composition are differentiated from polymer particles in that they are soluble in the water phase or combined water/water-soluble solvent phase of the ink. Included in this class of polymers are nonionic, anionic, amphoteric and cationic polymers. Representative examples of water soluble polymers include, polyvinyl alcohols, polyvinyl acetates, polyvinyl pyrrolidones, carboxymethyl cellulose, polyethyloxazolines, polyethyleneimines, polyamides and alkali soluble resins, polyurethanes (such as those found in U.S. Pat. No. 6,268,101), polyacrylic acids, styrene-acrylic methacrylic acid copolymers (such as Joncryl® 70 from S.C. Johnson Co., TruDot® IJ-4655 from MeadWestvaco Corp., and Vancryl® 68S from Air Products and Chemicals, Inc.

Ink compositions useful in the invention may include humectants and/or co-solvents in order to prevent the ink composition from drying out or crusting in the nozzles of the printhead, to aid solubility of the components in the ink composition, or to facilitate penetration of the ink composition into the image-recording element after printing. Representative examples of humectants and co-solvents used in aqueous-based ink compositions include (1) alcohols, such as methyl alcohol, ethyl alcohol, n-propyl alcohol, iso-propyl alcohol, n-butyl alcohol, sec-butyl alcohol, t-butyl alcohol, iso-butyl alcohol, furfuryl alcohol, and tetrahydrofurfuryl alcohol; (2) polyhydric alcohols, such as ethylene glycol, di(ethylene glycol), tri(ethylene glycol), tetra(ethylene glycol), propylene glycol, poly(ethylene glycol), poly(propylene glycol), 1,2-propanediol, 1,3-propanediol, 1,2-butanediol, 1,3-butanediol, 1,4-butanediol, 1,2-pentanediol, 1,5-pentanediol, 1,2-hexanediol, 1,6-hexanediol, 2-methyl-2,4-pentanediol, 1,2-heptanediol, 1,7-hexanediol, 2-ethyl-1,3-hexanediol, 1,2-octanediol, 2,2,4-trimethyl-1,3-pentanediol, 1,8-octanediol, glycerol, 1,2,6-hexanetriol, 2-ethyl-2-hydroxymethyl-propanediol, saccharides and sugar alcohols and thioglycol; (3) lower mono- and di-alkyl ethers derived from the polyhydric alcohols; such as, ethylene glycol monomethyl ether, ethylene glycol monobutyl ether, ethylene glycol monoethyl ether acetate, di(ethylene glycol) monomethyl ether, and di(ethylene glycol) monobutyl ether acetate (4) nitrogen-containing compounds such as urea, 2-pyrrolidone, N-methyl-2-pyrrolidone, and 1,3-dimethyl-2-imidazolidinone; and (5) sulfur-containing compounds such as 2,2'-thiodiethanol, dimethyl sulfoxide and tetramethylene sulfone.

Typical aqueous-based ink compositions useful in the invention directed at drop-on-demand ink jet printing may contain, for example, the following components based on the total weight of the ink: water 20-95%, humectant(s) 0-70%, and co-solvent(s) 0-20%.

Particularly preferred water soluble organic solvents useful in ink compositions directed at drop-on-demand printing applications containing the pigment and polymeric dispersants of the invention are tri(ethylene glycol) or poly(ethylene glycol) homopolymers having number average molecular weights ranging from about 200 to 1000, or mixtures of these solvents. Ink compositions containing tri(ethylene glycol) or poly(ethylene glycol) solvents used in the range of about 1 to 15% based on total ink weight are preferred, from 2 to 12% are more preferred and from 3 to 10% are most preferred.

Surfactants may be added to the ink composition to adjust the surface tension of the ink to an appropriate level provided that they do not compromise the colloidal stability of the pigment particles. The surfactants may be anionic, cationic, amphoteric or nonionic and used at levels of about 0.01 to 5% of the ink composition. Examples of suitable nonionic surfactants include, linear or secondary alcohol ethoxylates (such as the Tergitol® 15-S and Tergitol® TMN series available from Union Carbide Corp. and the Brij® series from Uniquema®, Imperial Chemical Industries PLC), ethoxylated alkyl phenols (such as the Triton® series from Union Carbide Corp.), fluoro surfactants (such as the Zonyls® from DuPont; and the Fluorads® from 3M Co.), fatty acid ethoxylates, fatty amide ethoxylates, ethoxylated and propoxylated block copolymers (such as the Pluronic® and Tetronic® series from BASF, ethoxylated and propoxylated polysiloxane based surfactants (such as the Silwet® series from GE Silicones, General Electric Co.), and acetylenic polyethylene oxide surfactants (such as the Surfynols® from Air Products and Chemicals, Inc.).

Examples of anionic surfactants include; carboxylated (such as ether carboxylates and sulfosuccinates), sulfated (such as sodium dodecyl sulfate), sulfonated (such as dodecyl benzene sulfonate, alpha olefin sulfonates, alkyl diphenyl oxide disulfonates, fatty acid taurates and alkyl naphthalene sulfonates), phosphated (such as phosphate esters of alkyl and aryl alcohols, including the Strodex® series from Dexter Chemical LLC.), phosphonated and amine oxide surfactants and anionic fluorinated surfactants. Examples of amphoteric surfactants include; betaines, sultaines, and aminopropionates. Examples of cationic surfactants include; quaternary ammonium compounds, cationic amine oxides, ethoxylated fatty amines and imidazoline surfactants. Additional examples are of the above surfactants are described in *McCutcheon's Emulsifiers and Detergents North American Edition International Edition* 1996 *Annuals*, Vol. 1, McCutcheon Division of Manufacturing Confectionar Co., Glen Rock, N.J. (1996).

A biocide may be added to an ink jet ink composition to suppress the growth of microorganisms such as bacteria, molds, fungi, etc. in aqueous inks. Useful preservatives are exemplified by alkylisothiazolones, chloroalkylisothiazolones, and benzisothiazolones. Preferred commercial products for use in an ink composition include Proxel® GXL (Arch Chemicals, Inc.) and Kordek® MLX (Rohm and Haas Co.) at a final concentration of 0.0001-0.5 wt. %. Additional additives which may optionally be present in an ink jet ink composition include thickeners, conductivity enhancing agents, anti-kogation agents, drying agents, waterfastness agents, dye solubilizers, chelating agents, binders, light stabilizers, viscosifiers or thickeners, buffering agents, anti-mold agents, anti-cockle agents, anti-curl agents, stabilizers, antifoamants and defoamers.

The pH of the aqueous ink compositions of the invention may be adjusted by the addition of organic or inorganic acids or bases. Useful inks may have a preferred pH of from about 2 to 11, depending upon the type of dye or pigment being used. Typical inorganic acids include hydrochloric, phosphoric and sulfuric acids. Typical organic acids include methanesulfonic, acetic, oxalic and lactic acids. Typical inorganic bases include alkali metal hydroxides and carbonates. Typical organic bases include ammonia, dimethylethanolamine, triethanolamine, and tetramethylethlenediamine.

In the case of ink jet printing the exact choice of ink components will depend upon the specific application and performance requirements of the printhead from which they are jetted. Thermal and piezoelectric drop-on-demand printheads and continuous printheads each require ink compositions with a different set of physical properties in order to achieve reliable and accurate jetting of the ink, as is well known in the art of inkjet printing. Acceptable viscosities for drop-on-demand printing are no greater than 20 cP, and preferably in the range of about 1.0 to 6.0 cP. Acceptable surface tensions for drop-on-demand printing are no greater than 60 dynes/cm, preferably in the range of 20 dynes/cm to 50 dynes/cm, and most preferably in the range of 28 dynes/cm to 45 dynes/cm.

The inventive carbon black pigment based-inks of the present invention may be used alone or in combination with a plurality of inks in an ink jet printer. In one embodiment, the inventive carbon black pigmented ink is used in an ink set comprising at least a cyan, a magenta and a yellow colorant. Useful ink sets also include, in addition to the cyan, magenta and yellow inks, complimentary colorants such as red, blue, violet, orange or green inks. In addition, the ink set may comprise light and dark colored inks, for example, light cyan and light magenta inks commonly used in the ink sets of wide format printers. The colored inks useful in the ink sets may be either dye-based or pigment-based, or a mixture of dye and pigment based. The carbon black pigmented inks of the present invention may also be present in an ink set comprising two or more black inks which differ in carbon black pigment concentration. The inventive carbon black pigmented inks of the present invention may themselves be toned with alternative colorants, for example cyan and magenta pigments. The carbon black pigmented inks of the present invention may also be present in an ink set comprising more than one black ink wherein the black inks are comprised of carbon black dispersions of different particle sizes.

In the present invention the inventive ink may be applied to a photoglossy (coated) or plain paper receiver (uncoated). The two types of receivers are distinguished from one another in that the photoglossy receiver is manufactured with a coated layer above the underlying paper support. Typically, such photoglossy receivers may be further categorized as having a swellable polymer coating (non-porous media) or a microporous (fine particles in binder) coating, although hybrid designs are also well known. Typical polymer coated media are capable of very high gloss in excess of 60 gloss units at a viewing angle of 60 degrees. Typical microporous media can be designed to have gloss values approaching those of some polymer coated media. The design of the both plain paper and photoglossy media vary widely depending on materials and paper manufacturing processes which should not be construed to limit the scope of the present invention.

The following examples are intended to illustrate, not to limit, the invention.

EXAMPLES

Polymeric Dispersant Preparation

Polymeric Dispersant A-1

In a 1-liter, three-necked round-bottom flask equipped with a reflux condenser were mixed under nitrogen atmosphere 50.0 g of benzyl methacrylate, 30.0 g of stearyl methacrylate, and 20.0 g of methacrylic acid, 4.0 g of 1-dodecanethiol, and 400 mL of methyl ethyl ketone. The solution was stirred and purged with nitrogen for 20 minutes and heated to 75° C. in a constant temperature bath; 3.0 g. of Azobisisobutyronitrile (AIBN) was added. After 24 hours, the resulting solution was cooled. The resulting polymer solution was mixed with water and potassium hydroxide to achieve 90% acid neutralization. Thereafter the whole mixture was distilled at 50° C. under reduced pressure to remove the organic solvent. The final polymer solution had a concentration of ca. 20 wt. % in water and its pH was ca. 8.5. The average number molecular weight was 4480 and the average weight molecular weight was 7450.

Polymeric Dispersant A-2

A-2 was prepared like A-1 except that 43 g of benzyl methacrylate, 35 g of stearyl methacrylate, 22 g of methacrylic acid, and 2.0 g of AIBN were used. The average number molecular weight was 4790 and the average weight molecular weight was 7900.

Polymeric Dispersant A-3

A-3 was prepared like A-1 except that 37 g of benzyl methacrylate, 30 g of stearyl methacrylate, and 33 g of methacrylic acid were used. The average number molecular weight was 4560 and the average weight molecular weight was 7620.

Comparative Polymeric Dispersant A-4

Using the same procedure as described above, 33.0 g of methacrylic acid and 67.0 g of benzyl methacrylate were polymerized at 70C, using 4.5 g of 1-dodecanethiol and 1.7 g of AIBN, and then 80% acid neutralized using potassium hydroxide. The final polymer solution had a concentration of ca. 20 wt. % in water and its pH was ca. 7.8. The average number molecular weight was 5040 and the average weight molecular weight was 8860.

Comparative Polymeric Dispersant A-5

A-5 was prepared like A-3 except that 22 g of methacrylic acid, 78 g of benzyl methacrylate, and 1.5 g of AIBN and 4.6 g of 1-dodecanethiol of were used. The average number molecular weight was 4320 and the average weight molecular weight was 7160.

Comparative Surfactant Dispersant A-6

This dispersant (potassium oleylmethyltaurate or KOMT) was obtained from the Chemical Production Division of Eastman Kodak Company.

Carbon Black Pigments and Properties

Table I is illustrative of the physical properties of a variety of carbon black pigment powders, some of which were used in the comparative and inventive dispersion and ink examples below. The NIPEx® carbon black pigments were obtained from Degussa Corporation and the Black Pearls® and Regal® samples from Cabot Corporation. Primary particle size, percent volatiles, DBP oil absorption values (a measure of carbon structure), and surface area per gram of carbon were obtained where possible from corporate literature. Surface area values were somewhat useful in estimating the amount of dispersant to use in the dispersion-making step.

Preparation of Carbon Black Pigment Dispersions

General Description Using Polymeric Dispersants A-1 Thru A-5 and Comparative Surfactant Dispersant A-6

A mixture of 470 g of polymeric beads (milling media) having a mean diameter of 50 micrometers, 53 g of carbon black pigment and an appropriate amount of a 20 weight percent aqueous polymer solution of Polymeric Dispersant A-1 thru A-5 was prepared and diluted with distilled water to give a total slurry weight of 1000 g. The mixture was milled for one hour at 1000 RPM using a Premier Mill 2500 Hv laboratory dispersator equipped with a 3.8 cm Cowles blade. It was then milled for an additional 23 hours at 2500 RPM while holding the temperature constant at 23° C. For dispersions utilizing Comparative Surfactant Dispersant A-6, the material was added as a solid to the slurry. The milled slurry mixture was then filtered through a 10 micrometer screen under vacuum to separate the milling media from the pigment dispersion. This filtrate was then filtered through a one-micrometer binder-free glass fiber filter (Pall Corp.) to obtain the final carbon black pigment dispersions having approximately 10 wt. percent of pigment. The ratio of polymeric dispersant (or surfactant dispersant) to pigment was optimized for each carbon black pigment and was found to be dependent on the primary particle size, the total surface area, and the structure of the carbon black pigment.

Median particle diameter of each dispersion was measured using a Microtrac Ultrafine Particle Analyzer (UPA) 150 from Microtrac, Inc. As used herein, median particle diameter refers to the 50th percentile such that 50 percent of the volume of the particles is composed of particles having diameters smaller than the indicated diameter.

Detailed Descriptions of Carbon Black Pigment Dispersion Preparations

Comparative Carbon Black Pigment Dispersion CD-1 was prepared according to the above general description using Polymeric Dispersant A-4 and Carbon Black Pigment C8 and the weight ratio of polymeric dispersant to pigment was 0.30:1.0. The median particle size was 70 nm.

Comparative Carbon Black Pigment Dispersion CD-2 was prepared like CD-1 except that Polymeric Dispersant A-5 was used. The median particle size was 70 nm.

Comparative Carbon Black Pigment Dispersion CD-3 was prepared like CD-1 except that Comparative Surfactant Dispersant A-6 was used. The median particle size was 68 nm.

TABLE I

Carbon Black Properties

| Carbon Black Pigment | Designation | Primary particle size (nm) | Structure (DPB number in mls/100 g) | Percent volatiles | Surface area (BET value in m$^2$/g of nitrogen adsorption) |
| --- | --- | --- | --- | --- | --- |
| NIPex ® 35 | C1 | 31 | Low (<60) | 0.5 | 65 |
| NIPex ® 150 | C2 | 25 | High (>100) | 10 | 110 |
| NIPex ® 180 IQ | C3 | 15 | High (>100) | 5 | 260 |
| Black Pearls ® 490 | C4 | 27 | High (124) | 1.0 | 87 |
| Black Pearls ® 570 | C5 | 24 | High (114) | 1.5 | 110 |
| Black Pearls ® L | C6 | 24 | Low (60) | 5.0 | 138 |
| Black Pearls ® 700 | C7 | 18 | High (117) | 2.5-3.0 | 200 |
| Black Pearls ® 880 | C8 | 16 | High (105) | 1.5 | 220 |
| Black Pearls ® 900 | C9 | 15 | Low (64) | 2-2.5 | 230 |
| Black Pearls ® 1000 | C10 | 16 | High (105) | 9.0 | 343 |

Comparative Carbon Black Pigment Dispersion CD-4 was prepared like CD1 except that Black Pigment C1 and Polymeric Dispersant A-2 were used. The median particle size was 125 nm.

Comparative Carbon Black Pigment Dispersion CD-5 was prepared like CD1 except that Carbon Black Pigment C9 and Polymeric Dispersant A-1 were used. The median particle size was 49 nm.

Comparative Carbon Black Pigment Dispersion CD-6 was prepared like CD1 except that Carbon Black Pigment C6 and Polymeric Dispersant A-1 were used. The weight ratio of polymeric dispersant to pigment was 0.35:1.0. The median particle size was 90 nm.

Inventive Carbon Black Pigment Dispersion CD-7 was prepared like CD-4 except that Carbon Black Pigment C2 was used. The median particle size was 105 nm.

Inventive Carbon Black Pigment Dispersion CD-8 was prepared like CD1 except that Polymeric Dispersant A-3 was used. The median particle size was 70 nm.

Inventive Carbon Black Pigment Dispersion CD-9 was prepared like CD-1 except that Polymeric Dispersant A-1 was used. The median particle size was 70 nm.

Inventive Carbon Black Pigment Dispersion CD-10 was prepared like CD-9 except that the weight ratio of polymeric dispersant to pigment was 0.20:1.0. The median particle size was 70 nm.

Inventive Carbon Black Pigment Dispersion CD-11 was prepared like CD-9 except that Carbon Black Pigment C4 was used and the weight ratio of polymeric dispersant to pigment was 0.16. The median particle size was 141 nm.

Inventive Carbon Black Pigment Dispersion CD-12 was prepared like CD-9 except that Carbon Black Pigment C5 was used and the weight ratio of polymeric dispersant to pigment was 0.20:1.0. The median particle size was 127 nm.

Inventive Carbon Black Pigment Dispersion CD-13 was prepared like CD-10 except that Carbon Black Pigment C2 was used. The median particle size was 105 nm.

Inventive Carbon Black Pigment Dispersion CD-14 was prepared like CD-4 except that Carbon Black Pigment C7 was used and the weight ratio of polymeric dispersant to pigment was 0.24:1.0. The median particle size was 95 nm.

Inventive Carbon Black Pigment Dispersion CD-15 was prepared like CD-14 except that Polymeric Dispersant A-1 was used. The median particle size was 95 nm.

Inventive Carbon Black Pigment Dispersion CD-16 was prepared like CD-15 except that the weight ratio of polymeric dispersant to pigment was 0.20:1.0. The median particle size was 98 nm.

Inventive Carbon Black Pigment Dispersion CD-17 was prepared like CD-4 except that Carbon Black Pigment C3 was used. The median particle size was 59 nm.

Comparative, Commerical Polymeric and Self-Dispersed Carbon Black Pigment Dispersions Comparative, commercially available carbon black pigment dispersions were obtained for comparative ink testing. Self-dispersed carbon black dispersions, Cab-O-Jet 200®, and Cab-O-Jet 300®, were obtained from Cabot Corporation; they had an approximate median particle size of ca. 125 nm and were representative of dispersions commonly used in text black inks in ink jet printers. Hostajet® Black O-PT (VP2676) and Black T-PT (LP2896), polymer-dispersed carbon black pigment dispersions were obtained from Clariant Corporation, and IDIS® 30, 31K, and 40 surfactant or polymer-dispersed carbon black pigment dispersions were obtained from Degussa Corporation.

Table II provides a summary of the dispersions prepared or obtained for ink evaluations.

TABLE II

Dispersions Used for Ink Jet Evaluations

| Dispersion class | Designation | Carbon pigment ID | Dispersant ID | Weight Ratio of dispersant to pigment | Particle size (nm) | Carbon DPB* designation |
|---|---|---|---|---|---|---|
| Comp. | CD-1 | C8 | A-4 | .30 | 70 | H |
| Comp. | CD-2 | C8 | A-5 | .30 | 70 | H |
| Comp. | CD-3 | C8 | A-6 | .30 | 68 | H |
| Comp. | CD-4 | C1 | A-2 | .30 | 125 | L |
| Comp. | CD-5 | C9 | A-1 | .30 | 49 | H |
| Comp. | CD-6 | C6 | A-1 | .35 | 90 | L |
| Inv. | CD-7 | C2 | A-2 | .30 | 105 | H |
| Inv. | CD-8 | C8 | A-3 | .30 | 70 | H |
| Inv. | CD-9 | C8 | A-1 | .30 | 70 | H |
| Inv. | CD-10 | C8 | A-1 | .20 | 70 | H |
| Inv. | CD-11 | C4 | A-1 | .16 | 141 | H |
| Inv. | CD-12 | C5 | A-1 | .20 | 127 | H |
| Inv. | CD-13 | C2 | A-1 | .20 | 105 | H |
| Inv. | CD-14 | C7 | A-2 | .24 | 95 | H |
| Inv. | CD-15 | C7 | A-1 | .24 | 95 | H |
| Inv. | CD-16 | C7 | A-1 | .20 | 98 | H |
| Inv. | CD-17 | C3 | A-2 | .30 | 59 | H |
| Comp. | Cab-O-Jet 200 ®, | Commercial | Self-disp. | None | 125 | N/A |
| Comp. | Cab-O-Jet 300 ®, | Commercial | Self-disp. | None | 125 | N/A |
| Comp. | HostaJet ® O-PT | Commercial | Surfactant or polymer | N/A | N/A | N/A |
| Comp. | HostaJet ® T-PT | Commercial | Surfactant or polymer | N/A | 119 | N/A |
| Comp. | IDIS ® 30 | Commercial | Surfactant or polymer | N/A | N/A | N/A |

TABLE II-continued

Dispersions Used for Ink Jet Evaluations

| Dispersion class | Designation | Carbon pigment ID | Dispersant ID | Weight Ratio of dispersant to pigment | Particle size (nm) | Carbon DPB* designation |
|---|---|---|---|---|---|---|
| Comp. | IDIS ® 31K | Commercial | Surfactant or polymer | | N/A | N/A |
| Comp. | IDIS ® 40 | Commercial | Surfactant or polymer | N/A | N/A | N/A |

*In Table 2 the carbon DBP oil absorption value has been given either a High (H) or Low (L) designation. H is for values >70; L for values <70. Such a demarcation is typical of the carbon industry when distinguishing high vs low structure carbon.

Comparative, Commercial Black Inks
  Pigmented Black Inks
  Inks designated BCI-1431 BK and BCI-1451 MBK were obtained from Canon U.S.A., Inc. Analysis of each ink indicated that the carbon black pigment in the -1431 BK sample was ca. 3.2 weight percent and in the -1451 MBK sample, ca. 4.2 weight percent. The BCI-1431 BK is believed to be polymer dispersed carbon black pigment while the BCI-1451 MBK is believed to be self-dispersed carbon black pigment.
  Dye-Based Black Inks
  A comparative dye-based, black ink designated BCI-6BK used in the Canon i960 desktop printer was obtained from Canon U.S.A., Inc.
Evaluation of Dispersion Particle Stability
  Each of the experimental carbon black pigment dispersions described above was subjected to elevated temperature by holding the samples for 1, 2, and 4 weeks at 60° C. in an enclosed bottle. UPA measurements were conducted to examine particle stability at each time interval; although there were some fluctuations in particle size, each of the experimental dispersions was found to be reasonably stable with none of the dispersions changing after about the first week by more than 5 percent and none changing by more than 20 percent over the duration of the 4 week test.
Black Ink Formulations
  Black inks were prepared from the dispersions listed in Table II. The three ink formulations used for ink jet printing are described in Table III. All units are in weight percent of component in the ink. The weight percent carbon in each ink was 4.0 percent which is typical of levels found in black pigmented inks designed for text printing. The surfactant was Strodex® PK-90, a phosphate ester (Dexter Chemical L.L.C.) and was varied to insure that ink static surface tensions were approximately matched and in the range of 30-40 dyne/cm. For a given pigment dispersion, each of these ink formulations provided about the same density on the photo glossy papers designed for high quality printing of photographic images whereas on the set of plain papers described below ink formulation A and B provided somewhat higher densities as compared to ink formulation C.

TABLE III

Black Pigment Ink Formulations

| Ink formula | PEG-400* | Glycerol | Ethylene Glycol | Surfactant |
|---|---|---|---|---|
| A | 8 | — | 5 | Varied 0.2-0.5 |
| B | 3 | 8 | 3 | Varied 0.2-0.5 |
| C | — | 8 | 5 | Varied 0.2-0.5 |

*Poly(ethylene glycol)-400 (average number weighted molecular weight ca. 400)

Drop-on-Demand Ink Jet Printing and Density Determination Methods
  Each of the dispersions in Table II was formulated according to the ink compositions of Table III. The inks were then loaded into empty ink cartridges; the cartridges were then loaded into a Canon i960 Photo Printer (Canon U.S.A, Inc.) thermal ink jet printer. A stepped target was printed that provided uniform patches of ink laid down in 10 percent increments from 10 to 100 percent. The printer drivers for the CMYK channels were set up to lay down the same amount of ink from each channel. Status A Visible (neutral) patch densities were measured using a Spectralino instrument. The maximum densities obtained (at the 100 percent ink lay down) were recorded on each of receivers tested. Two types of receivers were utilized; a porous glossy receiver (a coated paper) typical of that used for high quality photo-printing and a representative set of 16 plain papers (uncoated papers) comprising many of the common low-to-high quality papers utilized for desktop or SOHO printers in the U. S. market. In the case of the plain paper set, an average density was determine for each ink across all sixteen papers; a standard deviation of the set of densities was also calculated. Standard deviation is a direct measure of the density variability observed across the 16 papers. Lower standard deviation would mean less density variation from paper to paper within the set. Epson Premium Photo Glossy Paper was used as the photo-quality receiver. The papers comprising the 16 plain paper set are given in Table IV.

TABLE IV

Plain (Uncoated) Paper Set

| Paper designation | Company name | Paper brand name |
|---|---|---|
| P1 | Xerox | Extra Bright Inkjet Paper |
| P2 | Eastman Kodak | Bright White Inkjet Paper |
| P3 | Hewlett Packard | Bright White(Bright Inkjet) Paper |
| P4 | Hewlett Packard | HP Advanced Paper |
| P5 | Xerox | Premium Multipurpose Paper |
| P6 | Hewlett Packard | Color Inkjet Paper |
| P7 | Georgia-Pacific | Ink Jet Printer Paper |
| P8 | Hammermill | Fore MP |
| P9 | Georgia-Pacific | Multipurpose Paper |
| P10 | Great White(IP) | Great White Multi-Use |
| P11 | Hammermill | Copy Plus |
| P12 | Paris (Burlington) | PrintWorks Multipurpose Paper |
| P13 | Hewlett Packard | Office Paper (Multipurpose Copy Paper) |
| P14 | Hewlett Packard | Multipurpose Paper |
| P15 | Staples | Inkjet Paper |
| P16 | Georgia-Pacific | InkJet Paper |

Print Image Density, Gloss and Durability Results on Photo Glossy Receivers

Summarized in Table V are the image quality parameters obtained when the inventive and comparative black inks were printed onto the Epson Premium Photo Glossy Paper. Table V is intended to illustrate the substantial image quality and durability advantages of the inventive inks comprising the polymer dispersed carbon black pigment dispersions as compared to the comparative inks comprised of self-dispersed carbon black pigments or the surfactant dispersed carbon black pigments (i.e. the 200 ID series vs. inks 111, 113, 116, and 120). It is also intended to illustrate the importance of dispersion particle size and carbon structure (for example, ink 120 as compared to ink 200) within the set of polymer dispersed carbon black pigments.

High density (typically ca. 2.0 or greater), good visual gloss and good image durability are essential requirements for printing of high quality black and white photo images. For the same black ink to be useful in printing text it must also show good text density and durability on the plain papers likely to be utilized for desktop printing as described herein.

The advantage of the inventive dispersions comprising high structure (high DPB oil absorption values) as compared with low structure carbon black is illustrated in Table IV; this can be seen when comparing the density forming ability of comparative ink 120 that contains a carbon black dispersion comprised of a low structure carbon black pigment vs. inventive inks 200, 208 which contain an inventive carbon black dispersion comprised of a high structure carbon black; each uses the same polymer dispersant. The advantages of polymer dispersion particle size for printing of high quality black and white photographic images can be readily appreciated when comparing inventive inks 200, 204, and 205 vs. 220, 202, 203, 207, and 208. While some of the comparative inks shown in Table V (e.g., black pigment ink examples 116 and 118) may be useful for printing of high quality black and white photographic images on photo glossy receivers, they lack sufficient densities on plain papers as shown in Table VI. While the dye-based ink, such as ink 100, can satisfy many of needs of both text printing and photo-printing; dye-based inks exhibit poor light and gas fade properties, especially on porous, photo glossy receivers typically utilized for fast drying photo print-

TABLE V

Density and Image Quality Results of Photo Glossy Receiver

| Ink example ID* | Ink Designation | Dispersion from Table II or commercial | Ink formulation from Table III or text | Density | Visual Gloss | Rub Resistance |
|---|---|---|---|---|---|---|
| 100 | Comp dye | BCI-6BK | Commercial | 2.25 | V. High | V. Good |
| 111 | Comp. | Cab-O-Jet ® 200 | A | 2.28 | Poor | Poor |
| 113 | Comp. | Cab-O-Jet ® 300 | A | 2.2 | Poor | Poor |
| 118 | Comp. | CD-1 | A | 2.4 | V. High | V. Good |
| 116 | Comp. | CD-3 | A | 2.5 | V. High | Marginal |
| 120 | Comp. | CD-4 | A | 1.51 | High | V. Good |
| 200 | Inv. | CD-7 | A | 2.06 | High | V. Good |
| 220, 202, 203 | Inv. | CD-8, -9, -10 | A | 2.45-2.47 | V. High | V. Good |
| 207, 208 | Inv. | CD-15, -16 | A | 2.42 | V. High | V. Good |
| 204 | Inv. | CD-11 | A | 2.1 | High | V. Good |
| 205 | Inv. | CD-12 | A | 2.1 | High | V. Good |
| 212 | Inv. | CD-17 | A | 2.48 | V. High | V. Good |

*The ink example ID in Table V can be linked to those ink example ID's in Table VI below. Table VI contains a much larger set of ink examples for the plain paper receiver set.

It can be readily appreciated from Table V that the inventive inks are able to meet the essential requirements for printing of durable, high quality photographic images on photo glossy receivers. Absent additional binders, the inks comprising the self-dispersed or the surfactant-dispersed carbon black pigments are not capable of providing sufficient durability; further the inks comprising the self-dispersed carbon black pigments provide insufficient gloss to be useful for photo printing. The inks comprising self-dispersed carbon black pigments of median size greater than about 160 nm lack sufficient density and gloss to be considered useful for photo printing and have not been studied further with regards to being useful as a single ink for more general printing of all kinds of images (e.g., text or photo).

ing. Black inks based on carbon black pigments offer much better resistance to both light and gas fade. Further, dye-based inks, such as comparative ink example 100, exhibit inferior water fastness on plain papers as compared with the present inventive inks.

In order for the same black ink to be useful for printing both high quality black and white photographic images on photo glossy receivers and the printing of high quality text on uncoated paper it must also provide sufficient text density and durability on the plain papers likely to be utilized for desktop printing as described herein. Heretofore, a single black, pigment ink capable of satisfying this important need has not been provided. Surprisingly, this important, previously unmet need has been satisfied by the inks of the present invention as described by the results in Table VI.

TABLE VI

Density and Image Durability of Black Inks on Plain Paper Set of Table IV.

| Ink example | Ink designation | Dispersion from Table II or commercial | Ink formula from Table III or commercial | Average density across set | Standard deviation of densities across entire set | Smear resistance as text |
|---|---|---|---|---|---|---|
| 100 | Comp. dye | BCI-6BK | Commercial | 1.30 | 0.041 | V. Good |
| 101 | Comp. pigment | BCI-1431-BK | Commercial | 0.94 | 0.116 | V. Good |
| 103 | Comp. pigment | BCI-1451 MBK | Commercial | 1.32 | 0.122 | Poor |
| 104 | Comp. pigment | Clariant HostaJet ® O-PT | A | 1.18 | 0.231 | V. Good |
| 104 | Comp. pigment | Clariant HostaJet ® O-PT | B | 1.11 | 0.240 | V. Good |
| 105 | Comp. pigment | Clariant HostaJet ® T-PT | A | 1.20 | 0.230 | V. Good |
| 106 | Comp. pigment | Clariant HostaJet ® T-PT | B | 1.02 | 0.388 | V. Good |
| 107 | Comp. pigment | Degussa IDIS ® 30 | A | 1.03 | 0.08 | V. Good |
| 108 | Comp. pigment | Degussa IDIS ® 31K | A | 1.11 | 0.251 | V. Good |
| 109 | Comp. pigment | Degussa IDIS ® 40 | A | 0.96 | 0.037 | V. Good |
| 110 | Comp. pigment | Degussa IDIS ® 40 | B | 0.93 | 0.043 | V. Good |
| 111 | Comp. pigment | Cab-O-Jet ® 200 | A | 1.34 | 0.144 | Very poor |
| 112 | Comp. pigment | Cab-O-Jet ® 200 | B | 1.28 | 0.152 | Very poor |
| 113 | Comp. pigment | Cab-O-Jet ® 300 | A | 1.37 | 0.149 | Poor |
| 114 | Comp. pigment | Cab-O-Jet ® 300 | B | 1.35 | 0.110 | Poor |
| 115 | Comp. pigment | Cab-O-Jet ® 300 | C | 1.26 | 0.192 | Poor |
| 116 | Comp. Pigment | CD-3 | A | 1.06 | 0.125 | Good |
| 117 | Comp. pigment | CD-3 | B | 1.04 | 0.134 | Good |
| 118 | Comp. pigment | CD-1 | A | 1.02 | 0.177 | V. Good |
| 119 | Comp. pigment | CD-2 | A | 1.07 | 0.127 | V. Good |
| 120 | Comp. pigment | CD-4 | A | 1.11 | N/A | V. Good |
| 121 | Comp. pigment | CD-5 | A | 1.16 | 0.118 | V. Good |
| 200 | Inv. | CD-7 | A | 1.20 | N/A | V. Good |
| 201 | Inv. | CD-13 | A | 1.25 | 0.097 | V. Good |
| 202 | Inv. | CD-9 | B | 1.22 | 0.142 | V. Good |
| 203 | Inv. | CD-10 | B | 1.22 | 0.142 | V. Good |
| 204 | Inv. | CD-11 | A | 1.28 | 0.134 | V. Good |
| 205 | Inv. | CD-12 | A | 1.29 | 0.127 | V. Good |
| 210 | Inv. | CD-12 | B | 1.26 | 0.117 | V. Good |
| 206 | Inv. | CD-14 | A | 1.29 | 0.132 | V. Good |
| 211 | Inv. | CD-14 | C | 1.21 | 0.143 | V. Good |
| 207 | Inv. | CD-15 | A | 1.33 | 0.108 | V. Good |
| 208 | Inv. | CD-16 | A | 1.37 | 0.070 | V. Good |
| 209 | Inv. | CD-16 | B | 1.33 | 0.049 | V. Good |
| 212 | Inv. | CD-17 | A | 1.28 | 0.134 | V. Good |

The printed images from the inventive inks on the set of sixteen plain papers, most notably, inks 204 and 205, and especially inks 206-209 as shown in Table VI match or exceed the average density exhibited from the dye-based comparative ink 100, they readily exceed the average density shown from the comparative polymer dispersed black pigment inks 101, 104-110, 118-121 and the comparative surfactant based black pigment inks, 116-117, thus making them especially useful for the printing of text and black and white images onto plain paper receivers. These same inventive inks, especially, inks 206-209, satisfy the previously unmet need of providing both the density requirements and rub resistance for text printing on plain papers as opposed to the comparative inks 111-115, comprised of self-dispersed carbon black pigments, which satisfy only the average density requirement. Further, the standard deviation of the more preferred inventive inks is significantly lower than that of the comparative inks 111-115, thus making their density performance more consistent across the plain paper set. In addition, these same inventive inks (subset as shown in Table V) are able to also meet the requirements for printing of high quality black and white photographic images on photo glossy receivers thus enabling the inventive inks to be utilized effectively on both types of receiver. In other words a single or universal, black pigment ink is envisioned.

Table VII below is meant to provide the average density performance and density range observed for one of the most preferred inventive black inks on the five plain papers (P1-P5 from Table IV) so as to show that extremely high densities are provided by the inventive inks when selecting a preferred set of plain papers. The densities of the inventive inks are again seen to be comparable to the those obtained from black inks comprised of self-dispersed carbon black pigments and exceed those obtained inks comprised of dye-based black colorants used for text printing.

As most values for density are highly dependent on the amount of colorant in an ink, the ink formulation, the amount and ink jet drop volume of ink being provided to the receiver, and the characteristics of the receivers, it is essential that both commercially available black inks and internal control dispersions be formulated into black inks of similar properties to establish a true advantage over comparative art. It is of further value to illustrate in Table VII that the average densities reported over a narrow set of preferred, uncoated receivers is likely to exceed those reported over a much wider range of such receivers as is typical for the consumer usage and represented by those in Table IV, i.e. while it is easy (as shown below) to show an improvement over a very select range of papers the current invention has shown an improvement over a very wide range of receivers.

TABLE VII

Average Density and Density Variation of Black Inks on the Five Plain Papers (P1-P5)

| Ink Example | Designation | Dispersant type | Average density | Density range | Delta density range |
|---|---|---|---|---|---|
| 100 | Comp. dye | none | 1.31 | 1.27-1.40 | 0.13 |
| 113 | Comp. pigment | None-self dispersed | 1.47 | 1.32-1.56 | 0.24 |
| 116 | Comp. pigment | Small molecule | 1.17 | 1.04-1.32 | 0.28 |
| 118 | Comp. pigment | Polymeric-comparative | 1.22 | 1.03-1.50 | 0.47 |
| 208 | Inventive | Polymeric-inventive | 1.45 | 1.40-1.51 | 0.09 |

The invention has been described in detail and provides image-recording materials well suited to ink jet applications. The inventive black inks are expected to work well in all drop-on-demand printers including those utilizing thermal and piezoelectric-based print heads. In addition, as has been demonstrated within the examples, these inventive inks can be expected to work well on both uncoated and coated receivers, meeting all of the important requirements of each receiver type. It is further expected that the inventive black inks will meet the needs of continuous ink jet printers.

The invention has been described in detail with particular reference to certain preferred embodiments thereof, but it will be understood that variations and modifications can be effected within the spirit and scope of the invention.

The invention claimed is:

1. An ink composition comprising an aqueous media and a pigment dispersion comprising
   (a) a carbon black pigment having a DBP oil absorption of at least 70 ml/100 gram, and a median effective dispersion particle size of between 55 nm and 200 nm; and
   (b) a polymeric dispersant wherein said polymeric dispersant is a copolymer comprising:
      a) at least a hydrophobic methacrylate or acrylate monomer containing an aliphatic chain having greater than or equal to 12 carbons;
      b) a hydrophobic benzyl methacrylate or benzyl acrylate monomer; and
      c) a hydrophilic methacrylic or acrylic acid monomer;
      wherein said copolymer comprises greater than 20% by weight of the methacrylate or acrylate monomer containing an aliphatic chain having greater than or equal to 12 carbons and at least 15% by weight of the methacrylic or acrylic acid monomer, and the copolymer has a weight average molecular weight of less than 15,000 daltons.

2. The ink composition of claim 1 wherein the percent volatiles of the carbon black pigment is at least 1.0.

3. The ink composition of claim 1 wherein the percent volatiles of the carbon black pigment is in the range of 1.5 to about 10.0.

4. The ink composition of claim 1 wherein the DBP oil absorption value is in the range of 70 to 200 ml/100 gram.

5. The ink composition of claim 1 wherein the DBP oil absorption value is in the range of 70 to 150 ml/100 gram.

6. The ink composition of claim 1 wherein the carbon black pigment dispersion has a median effective dispersion particle size of between 55 nm and 170 nm.

7. The ink composition of claim 1 wherein the carbon black pigment dispersion has a median effective dispersion particle size of between 55 nm and 140 nm.

8. The ink composition of claim 1 wherein the hydrophobic benzyl methacrylate or benzyl acrylate monomer is benzyl methacrylate.

9. The ink composition of claim 1 wherein the copolymer has a weight average molecular weight of less than 10,000 daltons.

10. The ink composition of claim 1 wherein the methacrylate or acrylate monomer containing an aliphatic chain having greater than or equal to 12 carbons is stearyl or lauryl methacrylate or acrylate.

11. The ink composition of claim 1 wherein the copolymer comprises 15% to 30% by weight of the methacrylic or acrylic acid monomer.

12. The ink composition of claim 1 wherein the copolymer is a random copolymer.

13. The ink composition of claim 1 further comprising tri(ethylene glycol) or poly(ethylene glycol).

14. The ink composition of claim 13 wherein the poly (ethylene glycol) has a number average molecular weight of 200 to 1000.

15. The ink composition of claim 1 wherein the weight ratio of the copolymer to the pigment is 0.10 to 1.0.

16. An ink jet printing method comprising the steps of:
   A) providing an ink jet printer that is responsive to digital data signals;
   B) loading the printer with an ink jet recording element comprising an uncoated or coated ink receiving substrate;
   C) loading the printer with a black ink jet ink composition comprising an aqueous media and a pigment dispersion comprising:
      (a) a carbon black pigment having a DBP oil absorption of at least 70 ml/100 gram, and an average effective dispersion particle size of between 55 nm and 200 nm; and
      (b) a polymeric dispersant wherein said polymeric dispersant is a copolymer comprising at least a hydrophobic methacrylate or acrylate monomer containing an aliphatic chain having greater than or equal to 12 carbons; a hydrophobic benzyl methacrylate or benzyl acrylate monomer; and a hydrophilic methacrylic or acrylic acid monomer; wherein said copolymer comprises greater than 20% by weight of the methacrylate or acrylate monomer containing an aliphatic chain having greater than or equal to 12 carbons and at least 15% by weight of the methacrylic or acrylic acid monomer, and the copolymer has a weight average molecular weight of less than 15,000 daltons; and D) printing on the image receiving element using the ink jet composition in response to the digital data signals.

17. The method of claim 16 wherein the ink jet printer is a drop on demand printer.

18. The method of claim 16 wherein the ink jet printer is a continuous ink jet printer.

19. The method of claim 17 wherein the ink jet printer is a thermal drop on demand printer.

20. An ink jet printing method comprising the steps of:

A) providing an ink jet printer that is responsive to digital data signals;

B) loading the printer with an ink jet recording element comprising an uncoated or coated ink receiving substrate;

C) loading the printer with at least a cyan ink, a magenta ink, a yellow ink, and a black ink jet ink composition comprising an aqueous media and a pigment dispersion comprising
   (a) a carbon black pigment having a DBP oil absorption of at least 70 ml/100 gram, and an average effective dispersion particle size of between 55 nm and 200 nm; and
   (b) a polymeric dispersant wherein said polymeric dispersant is a copolymer comprising at least a hydrophobic methacrylate or acrylate monomer containing an aliphatic chain having greater than or equal to 12 carbons; a hydrophobic benzyl methacrylate or benzyl acrylate monomer; and a hydrophilic methacrylic or acrylic acid monomer; wherein said copolymer comprises greater than 20% by weight of the methacrylate or acrylate monomer containing an aliphatic chain having greater than or equal to 12 carbons and at least 15% by weight of the methacrylic or acrylic acid monomer and the copolymer has a weight average molecular weight of less than 15,000 daltons; and D) printing on the image receiving element using the ink jet composition in response to the digital data signals; wherein the printer utilizes the black ink composition as the sole black ink.

21. The method of claim 20 wherein the black ink jet ink composition is used for both text printing and photo printing.

* * * * *